Patented Dec. 7, 1926.

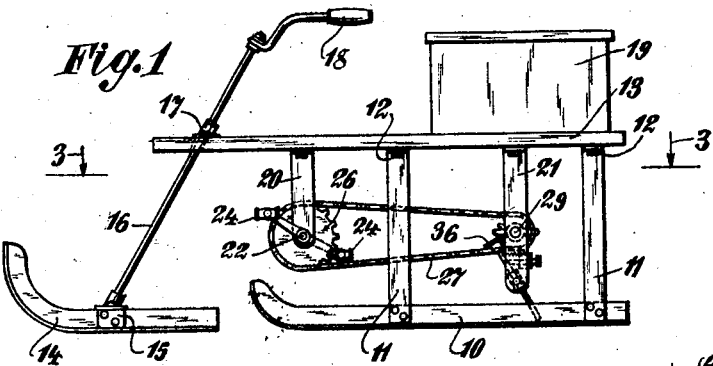
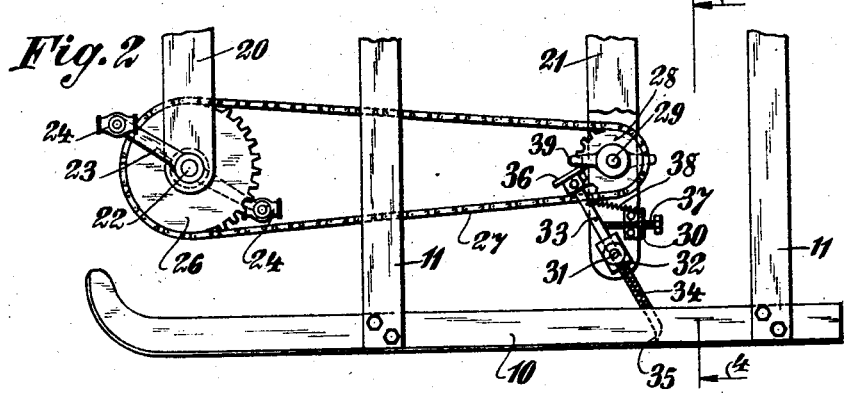
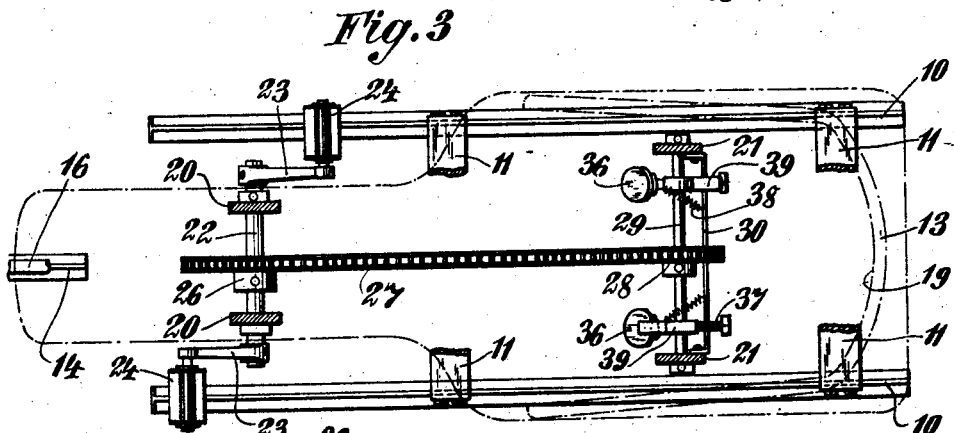
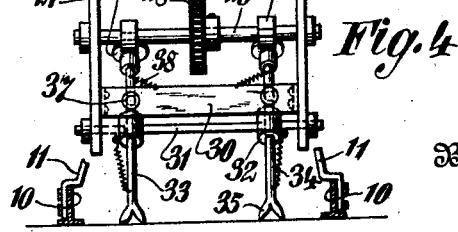

1,609,896

UNITED STATES PATENT OFFICE.

TOBIAS WASSERMAN, OF BRIDGEPORT, CONNECTICUT.

OCCUPANT-PROPELLED SLED.

Application filed December 16, 1925. Serial No. 75,663.

This invention relates to sleds and more particularly to types used by children in coasting on snow or ice, the same being a common form of outdoor exercise and amusement.

One of the objects of the invention is to provide a sled provided with means, similar to a bicycle, whereby the rider is enabled to advance the sled in an easy manner at a rapid speed over any suitable surface.

Another purpose is to produce a sled having a directional control feature operable by a rider without interference with the driving device.

A further aim is in the provision of a cheaply constructed sled having adequate strength and safety in use.

These objects are attained by the novel construction, combination and arrangement of parts hereinafter described and shown in the accompanying drawing, forming a material part of this disclosure, and in which:—

Figure 1 is a side elevational view of an embodiment of the invention.

Figure 2 is a fragmentary side view of the rear portion of the same, drawn to an enlarged scale.

Figure 3 is a longitudinal sectional view taken on line 3—3 of Figure 1.

Figure 4 is a transverse sectional view taken on line 4—4 of Figure 2.

A pair of rear runners, generally designated by the numeral 10, are preferably formed of T shaped rolled steel sections, the flat element being presented downward and the forward ends being curved upwardly in the usual manner.

Rigidly attached to the central, upper members of each runner, at points near their rear ends and intermediate their length, are pairs of supports 11, substantially upright and having outturned right angled pads 12 on which are secured a platform 13, the same being reduced in width at the front for essentially half its length.

A single front runner 14, of the same general construction, but of shorter length, has secured to it a rigid bracket 15 and fixed therein is the lower end of a rearwardly inclined steering post 16, passing through a bracket 17 fixed on the forward portion of the platform, to be turned therein by the steering handles 18 fixed on the upper end of the post 16, contiguous to the seat 19 on the rear portion of the platform 13.

Fixed on the lower side of the platform are two pairs of brackets 20 and 21, respectively forward and rear, and journalled in the front brackets is a shaft 22 to which are secured oppositely disposed cranks 23 carrying pedals 25, accessible to the feet of a rider at the side edges of the narrow part of the platform.

Fixed centrally on the shaft is a sprocket wheel 26 over which is trained a chain 27 driving a smaller sprocket wheel 28, fixed on a shaft 29 journalled in the rear brackets 21.

These rear brackets are connected near their lower ends by a cross-bar 30 and below the bar is a rod 31 carrying guides 32 in which are slidably mounted plungers 33 normally drawn upwardly by coiled compression springs 34.

The lower ends of the plungers terminate in sharply pointed forked pushers 35 adapted to engage the surface over which the sled is moved and at the upper ends are secured heads 36.

Adjusting screws 37 are threaded through the bar 30 so that their points abut the plungers which are held against them by the pull of tension springs 38.

Fixed on the rear shaft 29 are a pair of oppositely disposed lever-like projections 39 adapted to contact with the heads 36, thus pressing the plungers 33 alternately downward, the springs returning them in their initial position after the levers 39 have passed beyond their sphere of action.

It will be seen that the plungers, in moving down, cause the forks to engage and due to the angle, advance the sled, returning instantly to receive a second stroke intermittently applied and in alternate relation, propelling the sled in an obvious manner.

Having thus described my invention, what I claim as new and desire to secure by Letters Patent, is:—

1. A sled comprising a pair of runners, a single runner in advance of the first named runners by which the vehicle may be steered, a platform spaced thereabove, and extending rearward of the front runner, a pair of straight forked pushers slidable at an inclination to engage a surface, pedal means for actuating said pushers alternately, and means to return said pushers into position for further actuation.

2. A sled comprising a pair of runners, a third runner for directing the course of said vehicle, a platform spaced thereabove, a pair of straight forked pushers pivotally and slidably mounted, means to change the inclination of said pushers, flat heads on said pushers, and pedally actuated means for making alternate contact with said heads whereby the sled is advanced.

3. A sled comprising a pair of runners, a platform spaced thereabove, a single runner at the front, means for steering said front runner, a pair of shafts carried below said platform, a pair of pedals for driving one shaft, projections on the other shaft, driving connections between the shafts, a pair of headed plungers slidable at adjustable angles, said plungers being operated alternately by contact with said projections, and means for returning said plungers after actuation to their initial position, said plungers making contact intermittently with the surface to propel the sled.

In witness whereof I have affixed my signature.

TOBIAS WASSERMAN.